J. TOFIAS.
APPARATUS FOR MOLDING AND SHAPING HAT PARTS.
APPLICATION FILED JULY 1, 1918.
1,303,992.
Patented May 20, 1919.
Fig. 1.
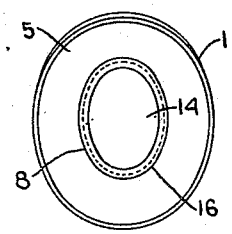
Fig. 2.
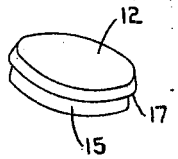
Fig. 3.
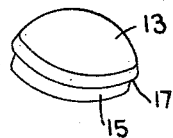
Fig. 4.
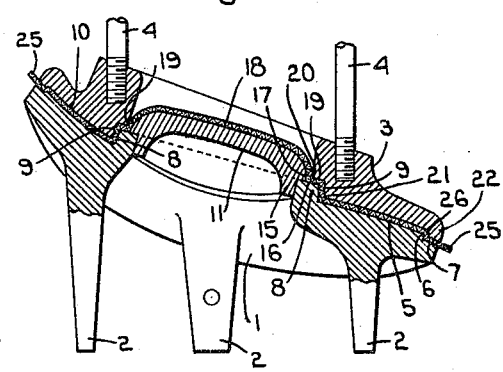
Fig. 5.
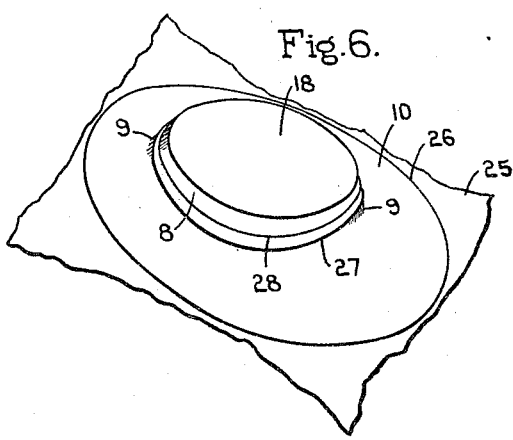
Fig. 8.
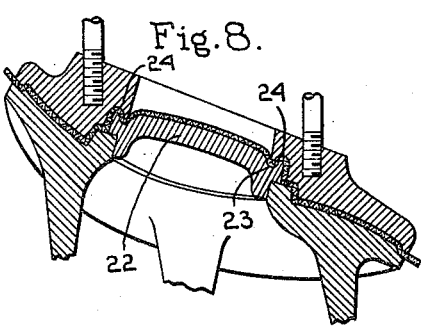
Fig. 6.
Fig. 7.
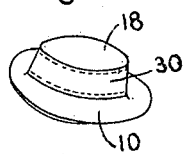
Inventor.
Julius Tofias
by Heard Smith & Tennant
Attys.

UNITED STATES PATENT OFFICE.

JULIUS TOFIAS, OF WINTHROP, MASSACHUSETTS, ASSIGNOR, BY MESNE ASSIGNMENTS, TO WINTHROP M. JAMESON, OF CAMBRIDGE, MASSACHUSETTS.

APPARATUS FOR MOLDING AND SHAPING HAT PARTS.

1,303,992.     Specification of Letters Patent.     Patented May 20, 1919.

Application filed July 1, 1918. Serial No. 242,778.

*To all whom it may concern:*

Be it known that I, JULIUS TOFIAS, a subject of Russia, and who has declared his intentions of becoming a citizen of the United States, residing at Winthrop, in the county of Suffolk and State of Massachusetts, have invented a new and useful Improvement in Apparatus for Molding and Shaping Hat Parts, of which the following is a specification.

My invention relates to an improved apparatus for molding and shaping hat parts.

The object of my invention is to provide an economical and effective time, labor and material saving apparatus for manufacturing hat parts, more particularly for ladies' hats such as are made up of cloth, felt, or fabrics by the molding process.

The object of the invention is further to provide a hat part molding apparatus in which a brim section and a tip section each of any desired shape and size are simultaneously formed, in which the brim section is formed with a head section, so that the brim section and the tip section of the molded article may be separated and united by a suitable side crown to form the completed hat.

The object of the invention is further to provide a molding apparatus of this class in which the tip shaping section of the mold shall be separable from the brim shaping section so that any desired tip shaping section may be obtained with any given style of brim shaping section.

The nature and objects of the invention will appear more fully from the accompanying description and drawings and will be particularly pointed out in the claims.

To illustrate my invention I have shown the same embodied in the accompanying drawing, but it will be understood that I do not wish to be limited thereto.

Referring to the drawing:

Figure 1 is a plan view of the lower or base mold of my apparatus, showing the tip-shaping section removed therefrom but indicated by the dotted line.

Fig. 2 is a perspective view of a tip-shaping section such as may be used with my apparatus.

Fig. 3 is a modified form of tip-shaping section in that the same is provided with a domed top instead of the flatter top shown in Fig. 2.

Fig. 4 is a vertical section taken through my apparatus showing the same in the act of molding the material provided therein.

Fig. 5 is a vertical and longitudinal section taken through the product produced with my type of apparatus shown in Fig. 4.

Fig. 6 is a perspective view of the product produced with the apparatus shown in Fig. 4.

Fig. 7 shows the tip and brim, produced by my apparatus, associated through the medium of the so-called side crown.

Fig. 8 is a view similar to Fig. 4 showing a modified form of apparatus such as may be used for manufacturing the so-called telescopic hat tips instead of the plain type shown in said Fig. 4.

The terms employed herein are used in the generic and descriptive sense to designate the elements illustrated, and are therefore not specifically intended as terms of limitation.

Certain preferred forms of apparatus embodying my invention are illustrated in the drawings but it is to be understood that the shapes and proportions will be altered to comply with the particular conditions and with the particular style and shape of hat or hat form to be produced. The mold is designed for use in the ordinary form of press machine having a table to support one of the mold parts and a head movable toward and from the table to support the other mold part and in which suitable provision is made for applying heat to the mold parts.

In the construction illustrated the base mold 1 is supported on the table of the press machine by suitable standards 2 formed preferably integral therewith while the upper or top mold 3 is secured to suspending studs 4 which carry the upper mold and hold it secured to the movable press machine head for operating therewith in the usual and well known manner.

The base mold 1 presents a brim shaping section 5, the shaping surface of which corresponds to the desired contour of the hat brim to be formed, and the outer periphery of which presents an outline edge 6 which may be formed by the usual annular depressed peripheral portion 7. At its inner periphery the brim forming surface of the brim shaping section 5 terminates in an annular shoulder 8 extending transversely to the brim shaping surface and in the particular form illustrated upstanding therefrom. This shoulder 8 serves to form the head section 9 projecting a slight distance from the brim section 10 of the hat and affords an opportunity for the usual side crown of the hat to be attached thereto by the usual sewing operation.

The tip shaping section 11 of the mold is preferably an independent part separable from the brim shaping section so that any desired shape or size of tip section may be formed along with a given brim section. In Figs. 2 and 3 two different forms of tip shaping section are separately shown for illustrating this feature. In Fig. 2 the top surface 12 of the tip shaping section is flat while in Fig. 3 this top surface 13 is dome shaped and it is obvious that any desired shape or size may be provided.

The separable tip shaping section is secured in place on the brim shaping section in any suitable manner. As a convenient means for uniting these two sections of the base mold the brim shaping section may be provided with a central opening 14 and the tip shaping section may be provided with a depending annular flange 15 adapted to fit within the central opening. The brim shaping section around the central opening 14 and between it and the shoulder 8 is provided with an annular surface 16 which is preferably flat, and the tip shaping section rests upon this annular surface and is so arranged that a portion of this annular surface 16 surrounds the outer peripheral edge 17 of the tip shaping section and extends to the shoulder 8.

The tip section 18 of the hat or hat shape is formed over the outer surface of the tip shaping section 11 and its peripheral edge is adapted to be secured to the top of the usual side crown by the usual stitching operation. The portion 19 of the material of the hat or hat shape formed upon the annular surface between the periphery 17 of the tip shaping section and the shoulder 8 is waste material and is discarded in the completed article.

The upper mold is formed to coöperate with the base mold in such a manner as to stretch the material of which the hat form is made snugly and tightly down over the surface of the base mold. The top mold is therefore provided with an annular edge 20 engaging the material along a line opposite the peripheral edge 17 of the tip shaping section so as to stretch the material over the tip shaping section. It is also provided with an annular edge to engage and stretch the material over the shoulder 8 which forms the head section attached to the brim section. With the upstanding shoulder 8 illustrated this annular edge of the upper mold is located at 21 and engages the material opposite the base of the shoulder 8. Preferably also the upper mold simultaneously stretches the material over the brim shaping section and for that purpose the upper mold is provided with an annular edge portion 22 engaging the depressed portion 7 and stretching the material down over the peripheral outline edge 6 of the brim shaping section.

Another slightly modified construction is shown in Fig. 8 wherein the tip shaping section is of a form which may be employed for shaping the so-called telescoping hat tips. In this construction the tip shaping section 22 is formed with a recess 23 and the upper mold is formed with a coöperating annular projection or collar 24 fitting into this recess and this collar may be made integral therewith or separate and detachably secured thereto. The coöperation of these features results in the formation of a telescoping hat tip of a familiar style.

In the operation of the apparatus the mold is opened by raising the upper mold 3 in the press machine so as to part the same from the lower mold 1. Then a piece of material 25 (which may be rectangular shaped,) is cut of suitable dimension sufficient, when stretched over the molding surface of the lower mold 1 to cover the outline of the brim. The material is usually moistened and the stretching operation is usually performed by two operators who spread out the piece of material and stretch it over the base mold. Then, with the material thus held in stretched condition the upper mold 3 is lowered over said material by the foot operation of one of the operators on a foot lever provided for the purpose and brought into locking engagement with the base mold and locked in position with the material set for shaping. The operators then release their hold on the material and the usual heating process is then applied for shaping the material in the mold. The material thus held in the mold is allowed to remain set therein and subject to the heating action for a few minutes after which when the upper mold is raised a product similar to that illustrated in Fig. 6 is removed from the mold.

This product which is novel with me and is the result of the use of the novel apparatus of this invention presents an article in which a hat tip section 18 is united to a hat brim section 10 having a head section 9. The exterior peripheral outline of the brim section 26 is defined as a sharp crease and the peripheral edge of the head section 9 is also defined as a sharp crease 27. The peripheral edge of the tip section is also defined as a sharp crease 28.

The material outside of the peripheral edge 26 of the brim section is trimmed off and the material between the creases 27 and 28 is cut away. As a result the tip section 18 and the brim section 10 of the hat or hat shape are completely formed and ready for uniting into a completed hat or hat shape by the stitching in place of a usual side crown 30 all as illustrated in Fig. 7.

The apparatus of this invention is designed to eliminate the needless wasting of the portion of material central of the brim section which is usually wasted in the process of forming hats or hat forms heretofore employed. This apparatus is further designed to produce a product as illustrated in Figs. 5 and 6 of the drawing which yields two independent hat parts, namely, the tip section and the brim section in a suitable operation in the same apparatus in the same length of time and with the same amount of labor. The allowance of material supplied to the mold parts is consequently slightly in excess of that used in connection with the common type of mold because of the necessity of discarding the small annular strip of material between the creases 27 and 28, but this amount is very slight as compared with the loss occasioned by discarding the entire central portion of the material.

It will now be observed that my process and apparatus may be used in the manufacture of hat parts of any of the known materials commonly used in connection with the old method described, and yields a great saving to the manufacturer in the cost of manufacture, and consequently benefits the consumer by reducing the purchase price of the finished product.

Any desired shape of brim or tip, with reference to contour and outline, may be effected in a similar manner by the application of suitable mold parts, thus affording a means for producing various shapes and styles of hats at the lowest cost.

The material employed may be of one or more plies which may have been adhesively or otherwise secured together before the molding operation, or during the molding operation, as is done in connection with the use of gummed stiffening material, such as buckramette or the like for stiffening purposes.

Having thus described my invention in detail, what I claim as new is:

1. An apparatus of the class described comprising a base mold having a brim shaping section and a tip shaping section, the said base mold having a shoulder to form a head section and having an annular surface extending between said shoulder and the periphery of the said tip shaping section.

2. An apparatus of the class described comprising the construction defined in claim 1 together with an upper mold engaging the base mold along the periphery of the tip shaping section and along the shoulder.

3. An apparatus of the class described comprising the construction defined in claim 1 together with an upper mold engaging the base mold along the periphery of the tip shaping section and along the base of the shoulder.

4. An apparatus of the class described comprising the construction defined in claim 1 together with an upper mold engaging the base mold along the periphery of the tip shaping section and along the shoulder and along the outer periphery of the brim shaping section.

5. An apparatus of the class described comprising the construction defined in claim 1 in which the tip shaping section is separable from the brim shaping section.

6. An apparatus of the class described comprising the construction defined in claim 1 in which the brim shaping section is provided with a central opening, in which the tip shaping section is separable from the brim section and is provided with a depending flange fitting within said opening with the periphery of the tip shaping section resting upon said annular surface of the brim section.

In witness whereof, I hereunto set my hand this 27th day of June, 1918.

JULIUS TOFIAS.

Witnesses:
DAVID LICHTENSTEIN,
JACOB I. RUBIN.